United States Patent
Shinomiya

(10) Patent No.: US 10,382,618 B2
(45) Date of Patent: Aug. 13, 2019

(54) COMMUNICATION APPARATUS AND CONTROL METHOD OF THE SAME

(71) Applicant: CANON KABUSHIKI KAISHA, Tokyo (JP)

(72) Inventor: Takeshi Shinomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/834,884

(22) Filed: Dec. 7, 2017

(65) Prior Publication Data

US 2018/0191893 A1    Jul. 5, 2018

(30) Foreign Application Priority Data

Dec. 14, 2016    (JP) .................................. 2016-242709

(51) Int. Cl.
*H04M 1/725*    (2006.01)
*H04W 4/50*    (2018.01)
*H04W 4/80*    (2018.01)

(52) U.S. Cl.
CPC ... *H04M 1/72577* (2013.01); *H04M 1/72569* (2013.01); *H04M 1/72572* (2013.01); *H04W 4/50* (2018.02); *H04M 1/7253* (2013.01); *H04M 2250/02* (2013.01); *H04M 2250/06* (2013.01); *H04M 2250/52* (2013.01); *H04W 4/80* (2018.02)

(58) Field of Classification Search
CPC ......... H04M 1/72577; H04M 1/72572; H04M 1/72569; H04W 4/50; H04W 4/80
See application file for complete search history.

(56) References Cited

U.S. PATENT DOCUMENTS

| | | | |
|---|---|---|---|
| 9,170,822 B1* | 10/2015 | Sharkey | G06F 1/3203 |
| 2014/0187222 A1* | 7/2014 | Lai | H04W 8/22 |
| | | | 455/418 |
| 2015/0326823 A1* | 11/2015 | Oh | H04L 65/1059 |
| | | | 348/14.07 |
| 2016/0227600 A1* | 8/2016 | Shedletsky | H04M 1/7253 |

FOREIGN PATENT DOCUMENTS

| | | |
|---|---|---|
| JP | 2009-164783 A | 7/2009 |
| JP | 2016-019160 A | 2/2016 |

* cited by examiner

*Primary Examiner* — Kathy W Wang-Hurst
*Assistant Examiner* — Minjung Kim
(74) *Attorney, Agent, or Firm* — Cowan, Liebowitz & Latman, P.C.

(57) ABSTRACT

A communication apparatus, when a first notification for deactivating all communication functions of a plurality of communication interfaces of an external apparatus is received from the external apparatus via a predetermined communication interface, does not deactivate a communication function of the predetermined communication interface for a predetermined time, when a second notification for individually activating at least one communication function out of the communication functions of the plurality of communication interfaces of the external apparatus is received via the predetermined communication interface within the predetermined time, activates a communication function of a communication interface that corresponds to the second notification, and after the predetermined time elapses, deactivates a communication function of a communication interface that does not correspond to the second notification.

13 Claims, 9 Drawing Sheets

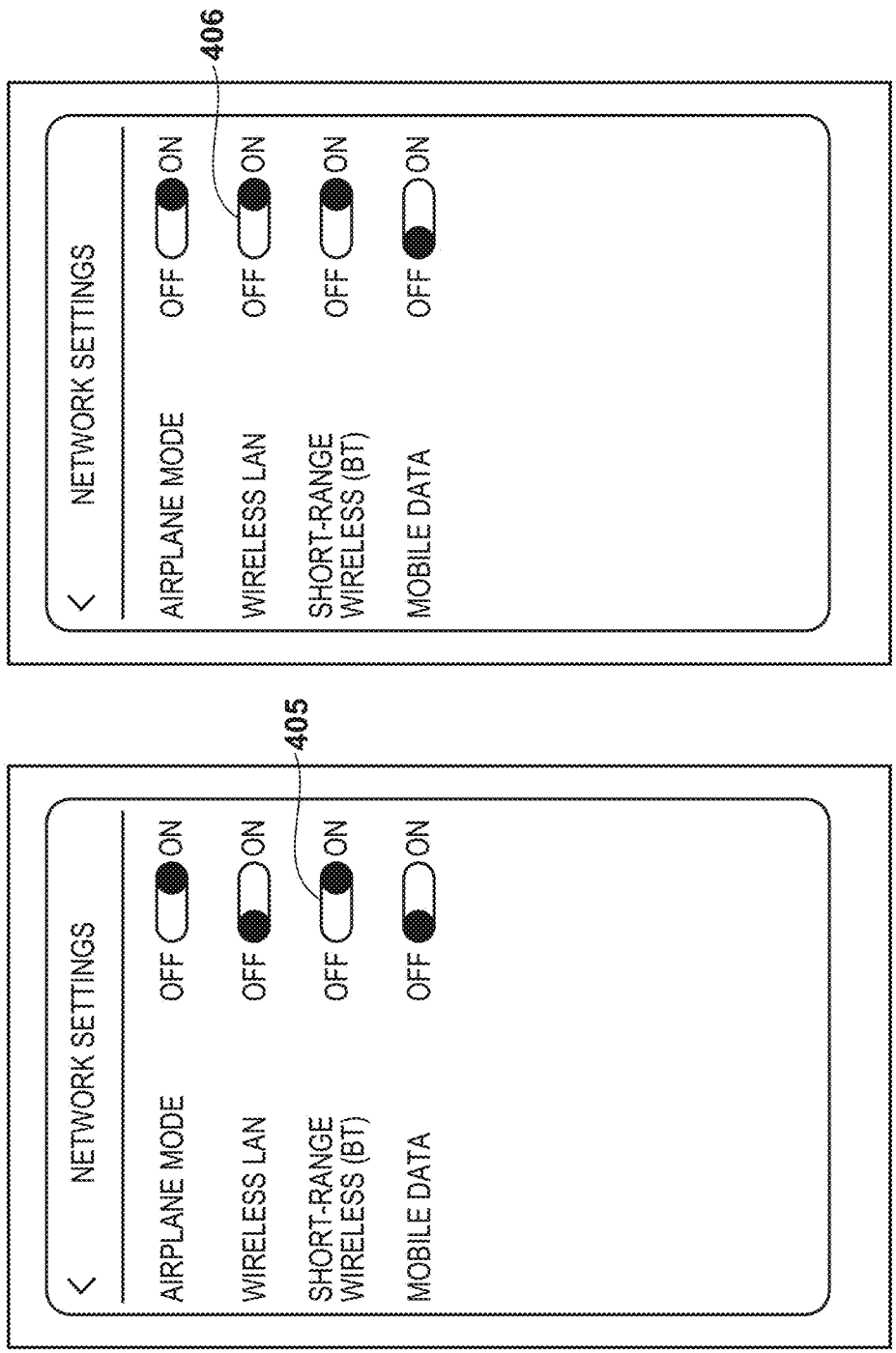

COMMUNICATION APPARATUS AND
CONTROL METHOD OF THE SAME

BACKGROUND OF THE INVENTION

Field of the Invention

The present invention relates to technology for controlling wireless communication.

Description of the Related Art

Communication apparatuses such as smartphones and tablet computers can be set to a mode called airplane mode, flight mode, offline mode, or the like in which wireless communication is not performed. When this type of communication apparatus is moved to an area in which wireless communication is prohibited, such as the inside of an airplane, the user prevents wireless communication from being performed by, for example, manually setting the communication apparatus to the airplane mode.

However, in recent years, external apparatuses such as wearable devices and digital cameras have also be provided with a wireless communication function, and there has been an increase in the number of use cases in which such external apparatuses are constantly connected to a communication apparatus such as a smartphone or a tablet by wireless communication technology such as Bluetooth®. In such use cases, if the user manually sets the communication apparatus to the airplane mode, the external apparatus is sometimes also set to the airplane mode in conjunction (see Japanese Patent Laid-Open No. 2009-164783 and Japanese Patent Laid-Open No. 2016-019160).

However, according to Japanese Patent Laid-Open No. 2009-164783 and Japanese Patent Laid-Open No. 2016-019160, inside an airplane in which wireless communication is permitted for example, after a communication apparatus has been temporarily set to the airplane mode, when wireless communication becomes permitted and the airplane mode is deactivated, the communication apparatus can then perform wireless communication. However, an external apparatus cannot recognize that the airplane mode was deactivated in the communication apparatus, and therefore the user needs to manually perform an operation for deactivating the airplane mode in the external apparatus.

SUMMARY OF THE INVENTION

The present invention has been made in consideration of the aforementioned problems, and realizes technology according to which, after a wireless communication function of an external apparatus has been set to the off state, wireless communication can be made usable again without a setting operation being performed by a user.

In order to solve the aforementioned problems, the present invention provides a communication apparatus comprising: a processor; and a plurality of communication interfaces configured to be capable of wireless communication with an external apparatus, wherein in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, the processor does not deactivate a communication function of the predetermined communication interface for a predetermined time, in a case where a second notification is received via the predetermined communication interface within the predetermined time, the second notification being transmitted in accordance with execution of an operation for individually activating at least one communication function out of the communication functions of the plurality of communication interfaces of the external apparatus, the processor activates a communication function of a communication interface that corresponds to the second notification, and after the predetermined time elapses, the processor deactivates a communication function of a communication interface that does not correspond to the second notification.

In order to solve the aforementioned problems, the present invention provides a control method of a communication apparatus having a processor and a plurality of communication interfaces that are capable of communication with an external apparatus, the method comprising: in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, not deactivating a communication function of the predetermined communication interface for a predetermined time, in a case where a second notification is received via the predetermined communication interface within the predetermined time, the second notification being transmitted in accordance with execution of an operation for individually activating at least one communication function out of the communication functions of the plurality of communication interfaces of the external apparatus, activating a communication function of a communication interface that corresponds to the second notification, and after the predetermined time elapses, deactivating a communication function of a communication interface that does not correspond to the second notification.

In order to solve the aforementioned problems, the present invention provides a computer-readable storage medium storing a program for causing a computer to function as a communication apparatus comprising: a processor; and a plurality of communication interfaces configured to be capable of wireless communication with an external apparatus, wherein in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, the processor does not deactivate a communication function of the predetermined communication interface for a predetermined time, in a case where a second notification is received via the predetermined communication interface within the predetermined time, the second notification being transmitted in accordance with execution of an operation for individually activating at least one communication function out of the communication functions of the plurality of communication interfaces of the external apparatus, the processor activates a communication function of a communication interface that corresponds to the second notification, and after the predetermined time elapses, the processor deactivates a communication function of a communication interface that does not correspond to the second notification.

According to the present invention, after a wireless communication function of an external apparatus has been set to the off state, wireless communication can be made usable again without a setting operation being performed by a user.

Further features of the present invention will become apparent from the following description of exemplary embodiments (with reference to the attached drawings).

BRIEF DESCRIPTION OF THE DRAWINGS

FIGS. 4A to 4D are diagrams illustrating a GUI of the smartphone according to the embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

This embodiment describes a system in which wireless communication is performed by a digital camera and a smartphone that respectively serve as a communication apparatus and an external apparatus that include a wireless LAN (Local Area Network) function and a short-range wireless communication function such as Bluetooth®. Note that the communication apparatus of the present embodiment is not limited to being a digital camera, and may be a tablet device, a media player, a surveillance camera, a medical device, or the like. Also, the external apparatus of the present embodiment is not limited to being a smartphone, which is a type of mobile phone, and may be a mobile device such as a watch-type terminal, an eyeglasses-type terminal, or a digital camera, tablet device, or personal computer that has a wireless communication function.

Configuration of Digital Camera

First, an overview of the configurations and functions of the digital camera and the smartphone of the present embodiment will be given with reference to FIG. 1.

Figure 1:
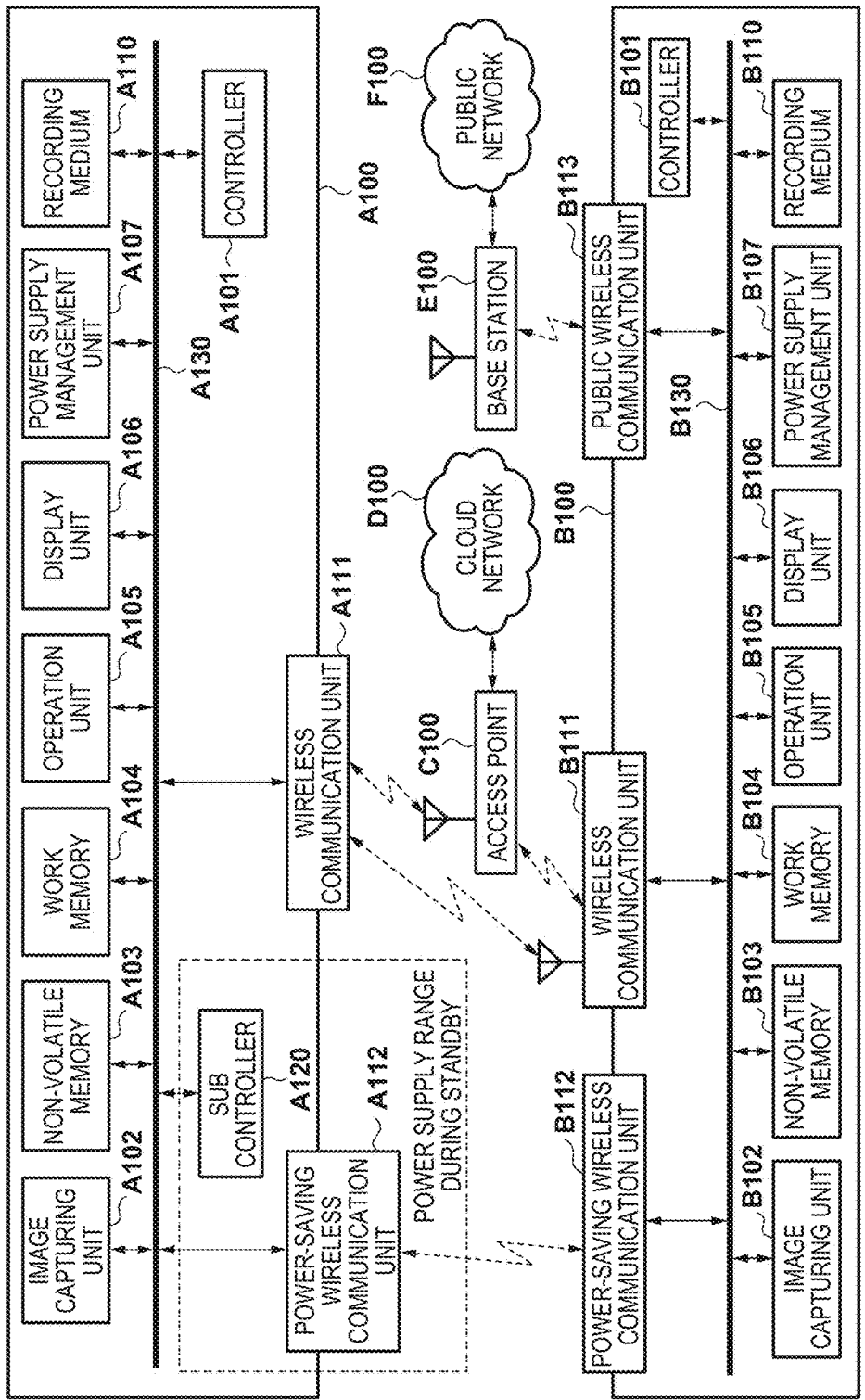
FIG. 1 is a configuration diagram of a system that includes a digital camera and a smartphone according to an embodiment of the present invention.

FIG. 1 shows the internal configurations of the digital camera and the smartphone that constitute the system of the present embodiment.

First, the configuration and functions of a digital camera A100 of the present embodiment will be described with reference to FIG. 1.

A controller A101 is a central processing unit (CPU) that performs overall control of the digital camera A100, and realizes later-described communication processing and control processing by executing programs stored in a non-volatile memory A103 that will be described later. Note that instead of the controller A101 performing overall control of the apparatus, overall control of the apparatus may be performed by allocating processing to pieces of hardware. The same applies to other hardware such as the digital camera and the smartphone that are described below, and such hardware may be configured by allocating processing to pieces of hardware.

An image capturing unit A102 is provided with a lens group that includes a zoom lens and a focus lens, and a shutter that includes a diaphragm function. The image capturing unit A102 is also provided with an image sensor that is constituted by a CCD or CMOS element or the like that converts a subject image into an electrical signal, and an A/D converter that converts an analog image signal output by the image sensor into a digital signal. Under control of the controller A101, the image capturing unit A102 converts light from a subject image formed by the lenses included in the image capturing unit A102 into an electrical signal with use of the image sensor, performs noise reduction processing and the like, and outputs resulting image data that is expressed by a digital signal.

The controller A101 subjects image data obtained by the image capturing unit A102 to resizing processing such as pixel interpolation or size reduction, and color conversion processing. The controller A101 then generates an image file by performing compression encoding such as JPEG compression encoding on still image data obtained by the above processing, or by encoding moving image data with a moving image compression technique such as MPEG2 or H.264, and then records the image file to a recording medium A110. With the digital camera A100 of the present embodiment, image data is recorded to the recording medium A110 in accordance with the DCF (Design rule for Camera File system) standard. The controller A101 also performs predetermined arithmetic processing with use of captured image data, and performs AF (automatic focus) processing and AE (automatic exposure) processing by controlling the focus lens, the diaphragm, and the shutter of the image capturing unit A102 based on the obtained calculation results.

The non-volatile memory A103 is an electrically erasable and recordable memory such as an EEPROM. The non-volatile memory A103 records constants, programs, and the like for operations performed by the controller A101. The programs referred to here are programs for executing a communication sequence and a control sequence that will be described later in the present embodiment.

A work memory A104 is used as a work area for constants and variables for operations performed by the controller A101, as well as the deployment of programs read out from the non-volatile memory A103, for example. The work memory A104 is also used as a buffer memory for temporarily storing image data captured by the image capturing unit A102, and an image display memory used by a display unit A106.

Figure 2A:
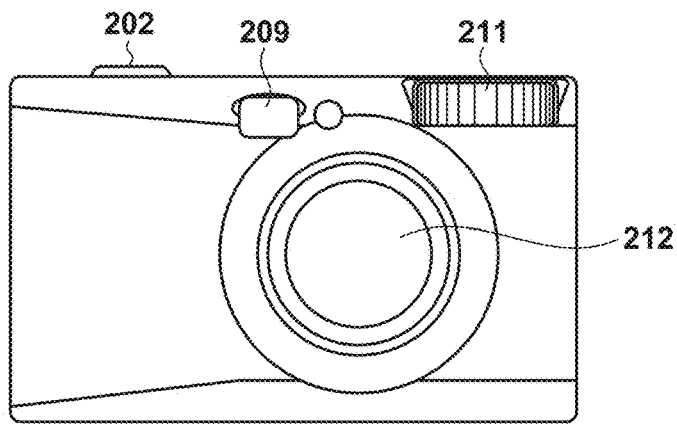
FIGS. 2A to 2E include external views of the digital camera according to the embodiment and diagrams illustrating a GUI.
Figure 2B:
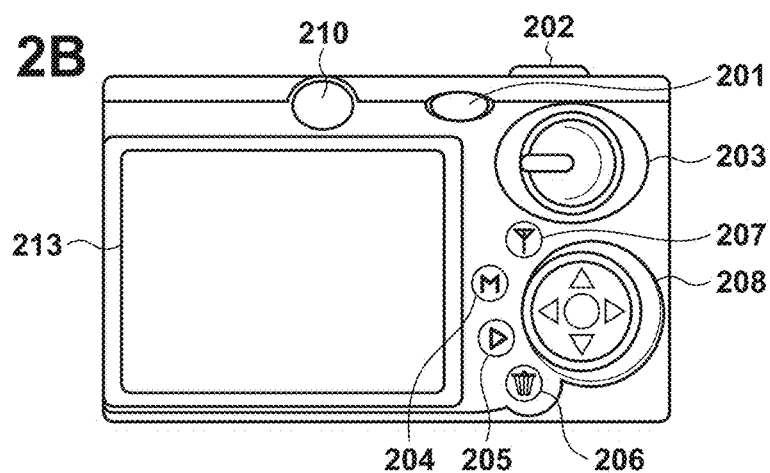

An operation unit A105 is constituted by operation members such as various switches and buttons and a touch panel for accepting various operations performed by a user. For example, as shown in FIGS. 2A and 2B, the operation unit A105 includes operation members such as a power button 201, a shutter button 202, a zoom lever 203, a menu button 204, a playback button 205, a delete button 206, a wireless button 207, and a cross key 208. The operation unit A105 also includes a touch panel that is integrated with a display panel of the later-described display unit A106.

The display unit A106 displays viewfinder images during shooting, shot images, text for interactive operations, and the like. The display unit A106 is a display device such as a liquid crystal display or an organic electroluminescence display. The display unit A106 may be integrated with the digital camera A100, or may be an external apparatus that is connected to the digital camera A100. It is sufficient that the digital camera A100 can be connected to the display unit A106 and has a function for controlling the display performed by the display unit A106.

A power supply management unit A107 controls the supply of power to the digital camera A100 in accordance with an operation signal from the power button 201. The power supply management unit A107 can supply power to the entirety of the digital camera A100, or supply power to only a sub controller A120 and a power-saving wireless communication unit A112 that will be described later. In the present embodiment, the following three activation states can be realized in accordance with the power supply level. There is a state in which the power supply management unit A107 supplies power to the entirety of the camera (power on state), a state in which the power supply management unit A107 supplies power to only the sub controller A120 and the power-saving wireless communication unit A112 (standby state), and a state in which the supply of power to the camera is stopped (power off state). The standby state is a state in which the power consumption of the digital camera A100 is very low.

Image data output from the image capturing unit A102 is recorded to the recording medium A110, and recorded image files are read out from the recording medium A110 by the controller A101. The recording medium A110 may be, for example, a memory card or a hard disk that is attached to the digital camera A100, or a flash memory or a hard disk that is built into the digital camera A100. It is sufficient that the digital camera A100 has at least a method for accessing the recording medium A110.

A wireless communication unit A111 is an interface for connection with an external apparatus such as a smartphone B100 that will be described later. The digital camera A100 of the present embodiment can exchange data with the external apparatus via the wireless communication unit A111. For example, image data can be transmitted to the external apparatus via the wireless communication unit A111. Note that in the present embodiment, the wireless communication unit A111 includes an interface for communicating with the external apparatus via a wireless LAN in accordance with the IEEE 802.11 standard. The controller A101 realizes wireless communication with the external apparatus by controlling the wireless communication unit A111. Note that the communication technique is not limited to a wireless LAN, and can include a wireless communication interface such as an infrared communication interface or Wireless USB.

Through this wireless LAN communication, the digital camera A100 can perform wireless communication with a nearby wireless access point (referred to hereinafter as simply "access point" or "AP") C100 or B111. Furthermore, using a host protocol such as TCP/IP, the digital camera A100 can exchange data with a server apparatus (not shown) that is connected to a cloud network D100, via the access point C100 or B111.

In addition to the functions described above, the wireless communication unit A111 further has a software AP function (master mode). This software AP function is a function that enables the wireless communication unit A111 to behave as a wireless access point under control of the controller A101. In the present embodiment, if the software AP function is activated, and a wireless communication unit B111 of the smartphone B100 connects to the wireless communication unit A111 instead of the access point C100, the digital camera A100 and the smartphone B100 can perform direct wireless communication.

The power-saving wireless communication unit A112 has an antenna for wireless communication, a modulation/demodulation circuit for processing wireless signals, and a communication controller. The power-saving wireless communication unit A112 performs short-range wireless communication in according with the IEEE 802.15 standard (so-called Bluetooth®) by outputting wireless signals from the antenna and demodulating wireless signals received by the antenna. Note that the communication technique is not limited to Bluetooth®, and may be a wireless communication technique such as ZigBee®.

In the present embodiment, Bluetooth® includes a communication mode called BLE (Bluetooth® Low Energy) in which power consumption is low, but speed is low (low-speed communication mode). Also, in the present embodiment, Bluetooth® includes a communication mode called classic BT (Classic Bluetooth®) in which power consumption is higher than BLE, but communication can be performed at a relatively higher speed (high-speed communication mode). Note that wireless LAN communication has a higher power consumption than the aforementioned classic BT, but communication can be performed at an even higher speed.

The sub controller A120 controls communication performed by the power-saving wireless communication unit A112, and also controls the digital camera A100 in the standby state. The sub controller A120 is internally provided with a work memory and a non-volatile memory that are necessary for operations, and thus the sub controller A120 can operate even in the standby state in which power is not supplied to the non-volatile memory A103 and the work memory A104.

Also, even when the digital camera A100 is in the standby state, the sub controller A120 can cause the power-saving wireless communication unit A112 to perform communication with the later-described smartphone B100. Furthermore, the sub controller A120 can revert the digital camera A100 from the standby state to the power on state via the power supply management unit A107 in accordance with the content of communication performed by the power-saving wireless communication unit A112.

Note that the blocks shown in FIG. 1 are connected to each other via an internal bus A130.

Next, the configuration and functions of the smartphone B100 of the present embodiment will be described with reference to FIG. 1.

The smartphone B100 of the present embodiment includes a controller B101, an image capturing unit B102, a non-volatile memory B103, a work memory B104, an operation unit B105, a display unit B106, a power supply management unit B107, a recording medium B110, a wireless communication unit B111, and a power-saving wireless communication unit B112. The basic functions of the aforementioned blocks are similar to those of the digital camera A100 and therefore will not be described in detail, and the following description focuses on portions that are different.

The display unit B106 displays shot images and GUIs (Graphical User Interfaces) that include text, graphics, symbols, and the like for performing interactive operations.

A public wireless communication unit B113 is an interface for performing communication with a public network F100 via a base station E100. The public wireless communication unit B113 has an antenna for wireless communication, a modulation/demodulation circuit for processing wireless signals, and a communication controller. In the present embodiment, the public wireless communication unit B113 performs public wireless communication in accordance with a standard such as W-CDMA (UMTS) or LTE (Long Term Evolution).

Note that the blocks described above are connected to each other via an internal bus B130. Also, in the example shown in FIG. 1, the digital camera A100 and the smartphone B100 communicate in a one-to-one manner, but the digital camera A100 can perform one-to-many communication with multiple smartphones.

External View and GUI

Next, an external view of the digital camera A100 and GUIs of the present embodiment will be described with reference to FIGS. 2A to 2E.

Figure 2C:
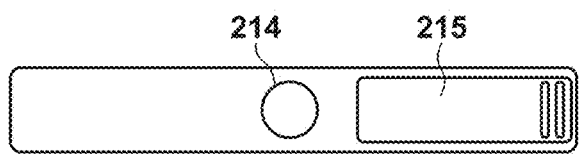

FIGS. 2A to 2C are respectively a front view, a back view, and a bottom view of the external configuration of the digital camera A100 of the present embodiment.

The power button 201 is an operation member for turning the power supply of the digital camera A100 on and off.

The shutter button 202 is an operation member for giving a still image shooting instruction and moving image shooting start and end instructions. The shutter button 202 is a two-level press type of operation member that can detect a half-pressed state and a fully-pressed state. By half-pressing the shutter button 202, a user can give an instruction to start shooting preparation operations such as AF (automatic focus) processing, AE (automatic exposure) processing, AWB (automatic white balance) processing, and EF (flash pre-emission). Also, by fully pressing the shutter button 202, the user can give an instruction to start a series of shooting operations from the read-out of signals from the image capturing unit A102 to the writing of image data to the recording medium A110. Also, in the moving image shooting mode, the user can instruct the start of moving image shooting by fully pressing the shutter button 202, and instruct the end of moving image shooting by then fully pressing the shutter button 202 again.

By moving the zoom lever 203 up and down, the user can give an instruction for a zoom-in operation and a zoom-out operation of the zoom lens.

By pressing the menu button 204, the user can display GUIs including function buttons, menu items, and the like on a later-described display panel 213.

By pressing the playback button 205, the user can cause image data such as still images or moving images that are recorded in the recording medium A110 to be displayed on the later-described display panel 213.

By pressing the delete button 206, the user can cause image data being displayed on the later-described display panel 213 to be deleted from the recording medium A110.

By pressing the wireless button 207, the user can then touch a GUI (FIG. 2D) displayed on the later-described display panel 213 and change settings of the wireless communication unit A111 and the power-saving wireless communication unit A112.

The cross key 208 is an operation member that is included in the operation unit A105, and includes an up button, a down button, a left button, a right button, and a center button. By operating the cross key 208, the user can change the image data that is displayed on the later-described display panel 213 and select menu items, for example.

A viewfinder window 209 is an optical member in which a subject image is optically projected, and the user can look through a below-described viewfinder eyepiece unit 210 in order to view a subject image when making a composition determination during shooting.

By looking through the viewfinder eyepiece unit 210, the user can optically view a subject image being projected in the viewfinder window 209.

A stroboscope 211 complements image brightness by emitting light as necessary when performing shooting under dark conditions.

A shooting lens 212 includes a lens group that includes a zoom lens and a focus lens, and a shutter that includes a diaphragm function.

The display panel 213 is an LCD (Liquid Crystal Display) or the like that is included in the display unit A106, and is used for determining the shooting range (determining the composition) before starting shooting, displays operation menus, and displays a playback of captured image data.

A tripod fixing hole 214 is a threaded hole for the attachment of a tripod.

A memory/battery lid 215 is a lid for opening and closing a memory card slot and a battery storage portion, and the user can open the lid 215 in order to insert/remove a memory card and a battery.

Figure 2D:
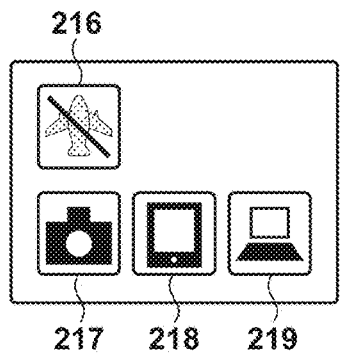
Figure 2E:
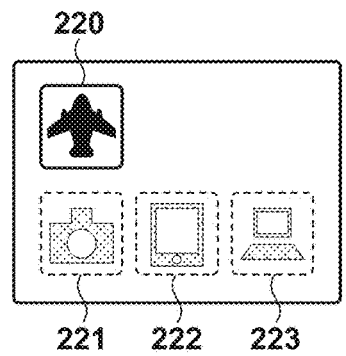

FIGS. 2D to 2E show a GUI that is displayed on the display panel 213 of the digital camera A100 when the user has pressed the wireless button 207. In this GUI screen, by using the up, down, left, and right buttons of the cross key 208 to select later-described icons 216 to 223 and then determining the selection with the center button, it is possible to instruct the digital camera A100 to perform a process that is associated with the selected icon.

The icons 216 and 220 are function buttons for displaying the airplane mode state and switching the airplane mode on/off in the digital camera A100. In the present embodiment, the airplane mode refers to a mode in which the wireless communication functions of the device are all turned off, and the device does not emit radio waves. This mode is called "airplane mode" because functions for emitting radio waves from mobile phones and the like are generally prohibited in an airplane. When the airplane mode setting is on, the icon 220 is displayed, and when the airplane mode setting is off, the icon 216 is displayed. When the icon 216 is selected, the airplane mode setting is changed from off to on, and the icon 220 is displayed on the display panel 213. On the other hand, when the icon 220 is selected, the airplane mode setting is changed from on to off, and the icon 216 is displayed on the display panel 213.

Note that when the airplane mode setting is on, the wireless communication unit A111 and the power-saving wireless communication unit A112 of the digital camera A100 stop all communication (transmission and reception of wireless radio waves), and enter a state of not emitting radio waves. Accordingly, when the airplane mode setting is on, in the digital camera A100, wireless communication by the wireless communication unit A111 and the power-saving wireless communication unit A112 with the smartphone B100 is disabled (deactivated), and when the airplane mode setting is off, wireless communication by the wireless communication unit A111 and the power-saving wireless communication unit A112 with the smartphone B100 is enabled (activated).

The icon 217 is a function button for instructing the digital camera A100 to connect to another digital camera (not shown).

The icon 218 is a function button for instructing the digital camera A100 to connect to an external apparatus such as the smartphone B100.

The icon 219 is a function button for instructing the digital camera A100 to connect to an external apparatus such as a personal computer (not shown).

The icons 221 to 223 are function buttons that correspond to the above-described icons 217 to 219, but are displayed in a non-selectable state due to the airplane mode setting being on, and wireless communication being deactivated.

Figure 3A:
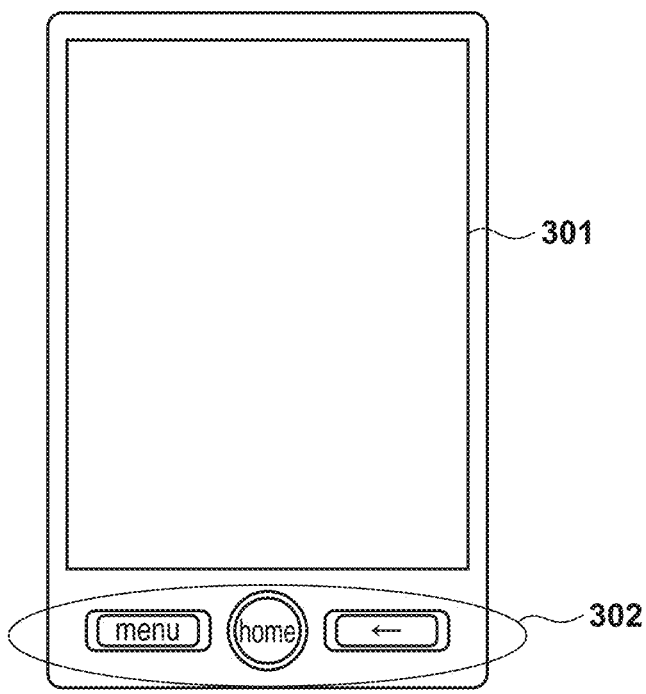
FIGS. 3A and 3B are external views of the smartphone according to the embodiment.
Figure 3B:

FIGS. 3A and 3B are respectively a front view and a side view of the external configuration of the smartphone B100 of the present embodiment.

A touch panel display 301 is a liquid crystal panel that is provided with a touch panel capable of detecting touch operations performed by a user finger or pen, and has a touch panel unit that is an operation member included in the operation unit B105, and a display unit that is a block included in the display unit B106. By touching the touch panel unit, the user can perform operations and like on the GUI displayed by the touch panel display 301.

Operation buttons 302 are operation members included in the operation unit B105, and by pressing the operation buttons 302, the user can switch functions of the smartphone B100 and perform operations and the like on the GUI displayed on the display unit B106, for example.

Volume buttons 303 are operation members included in the operation unit B105, and by pressing the volume buttons 303, the user can adjust the speaker volume.

The power button 304 is an operation member included in the operation unit B105, and by pressing the power button 304, the user can perform operations for turning on and off the power supply of the smartphone B100.

FIGS. 4A to 4D show examples of GUIs displayed on the touch panel display 301 of the smartphone B100. In the GUI screens in these figures, by operating function buttons 401, the user can set an on or off state for the wireless LAN function performed using the wireless communication unit B111, the Bluetooth® (called BT hereinafter) function performed using the power-saving wireless communication unit B112, and the mobile data communication function performed using the public wireless communication unit B113.

Figure 4B:
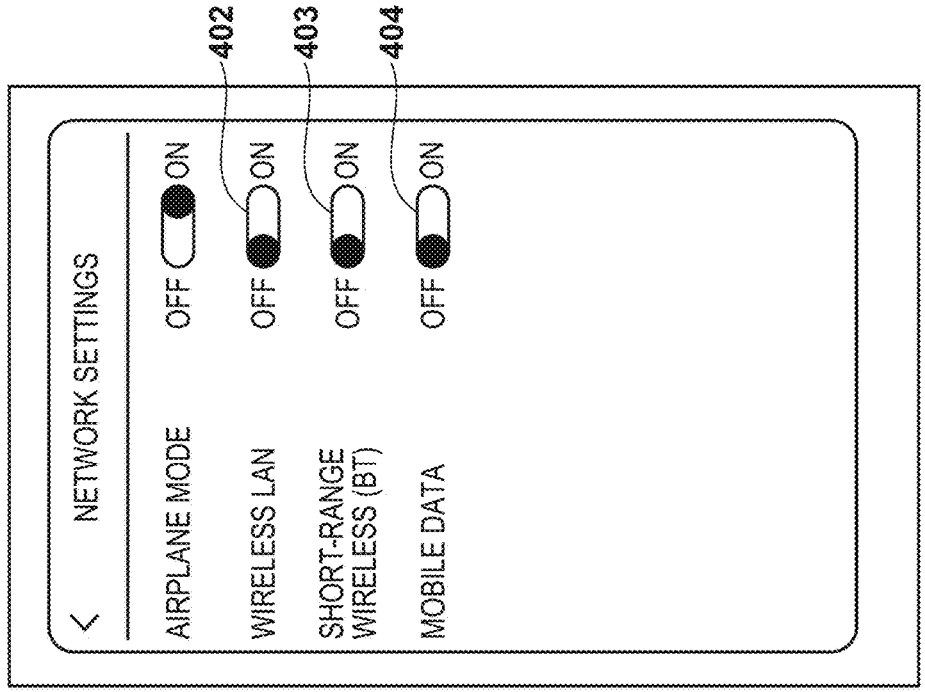
Figure 4A:
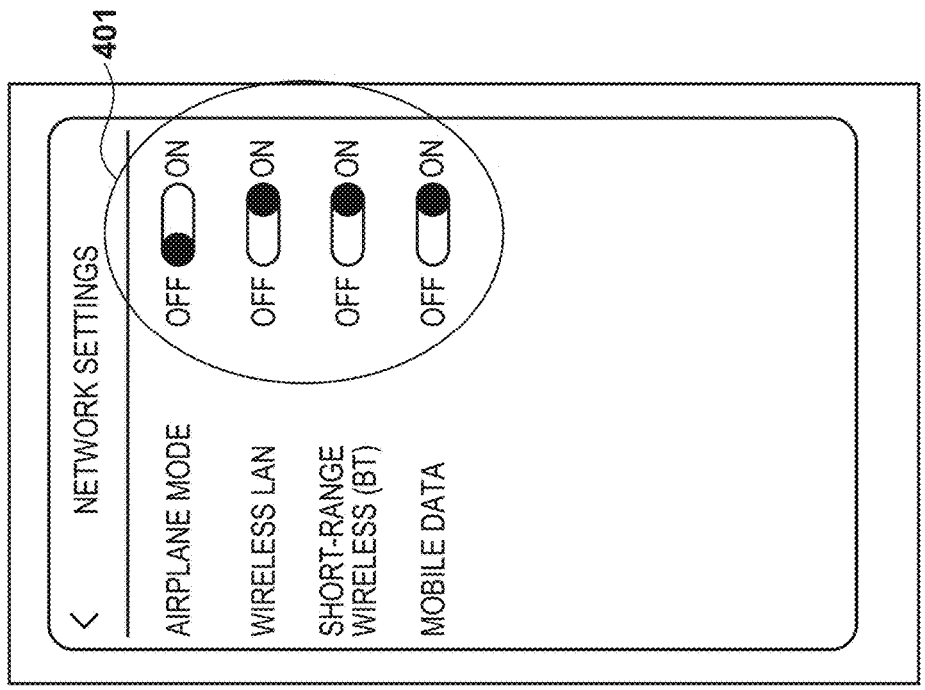

In FIG. 4A, the airplane mode has been set to the off state in the smartphone B100, and communication can be performed using any of the wireless LAN function, the BT function, and the mobile data communication function.

FIG. 4B shows an example of the GUI in FIG. 4A after the airplane mode has been changed to the on state. When the airplane mode is turned on, the settings of the wireless LAN function 402, the BT function 403, and the mobile data communication function 404 are all changed to the off state, thus realizing a state in which communication cannot be performed using these functions.

FIG. 4C shows an example of the GUI in FIG. 4B after the setting of the BT function 405 has been changed to the on state. In the present embodiment, even if the airplane mode is in the on state, communication functions can be individually switched on. FIG. 4C shows the case where the airplane mode is in the on state and the setting of the BT function 405 is in the on state, and in this case, communication can only be performed using the BT function performed using the power-saving wireless communication unit B112.

FIG. 4D shows an example of the GUI in FIG. 4C after the setting of the wireless LAN function 406 has been changed to the on state. If the airplane mode and the BT function are in the on state and the wireless LAN function 406 is switched on, communication can be performed using the wireless LAN function performed using the wireless communication unit B111 and the BT function performed using the power-saving wireless communication unit B112.

In this way, with the smartphone of the present embodiment, after the airplane mode has been switched on, and all of the wireless communication functions have been switched off, desired communication functions can be individually returned to the on state. The reason this configuration is used is that there are airlines that prohibit connections to a public line and the Internet, but permit wireless communication in the case of local network connections or ad-hoc network connections between devices. For example, before an airplane departs, the airplane mode is switched on, and only the wireless LAN communication function is activated by switching on the wireless LAN communication function. In this state, depending on the airline, even when inside an airplane for example, passengers who are friends can perform peer-to-peer communication, and a person can connect a digital camera and a smartphone to each other. Examples of the aforementioned connections include a connection in a wireless LAN ad-hoc mode, a connection in an infrastructure mode in which one device operates as a wireless LAN access point that does not use a gateway function (software AP), a connection compliant with the Wi-Fi Direct standard, and a connection using the BT function.

Here, a problem arises in the case where the airplane mode of the digital camera is switched on in conjunction with the airplane mode being switched on in the smartphone. This case can occur when, for example, synchronization of the settings of the smartphone and the digital camera has been set in advance, and the digital camera is notified that the smartphone will shift to the airplane mode. If this synchronization of settings is performed, when the airplane mode is switched on in the smartphone, the airplane mode is also switched on in the digital camera in conjunction. However, even if the wireless LAN communication function of the smartphone is individually switched on thereafter, the airplane mode has been switched on in the digital camera, and therefore the digital camera cannot be given a notification for setting the wireless LAN communication function to the on state. In other words, the wireless LAN communication function of the digital camera cannot be turned on unless the digital camera is directly operated. This is particularly a problem in the case where a bag storing the digital camera has been stowed in a baggage bin. In the present embodiment, processing such as the following is performed in order to resolve this issue.

Operations

Next, operations of the digital camera A100 and the smartphone B100 of the present embodiment will be described with reference to FIGS. 5A, 5B and 6. Note that it is assumed that prior to the operations of the present embodiment, the power-saving wireless communication unit A112 of the digital camera A100 and the power-saving wireless communication unit B112 of the smartphone B100 have been set such that communication can be performed therebetween (i.e., have been paired).

Operations of Digital Camera A100

First, operations of the digital camera A100, which can communicate with the smartphone B100 of the present embodiment, will be described with reference to FIGS. 5A and 5B.

Figure 5A:
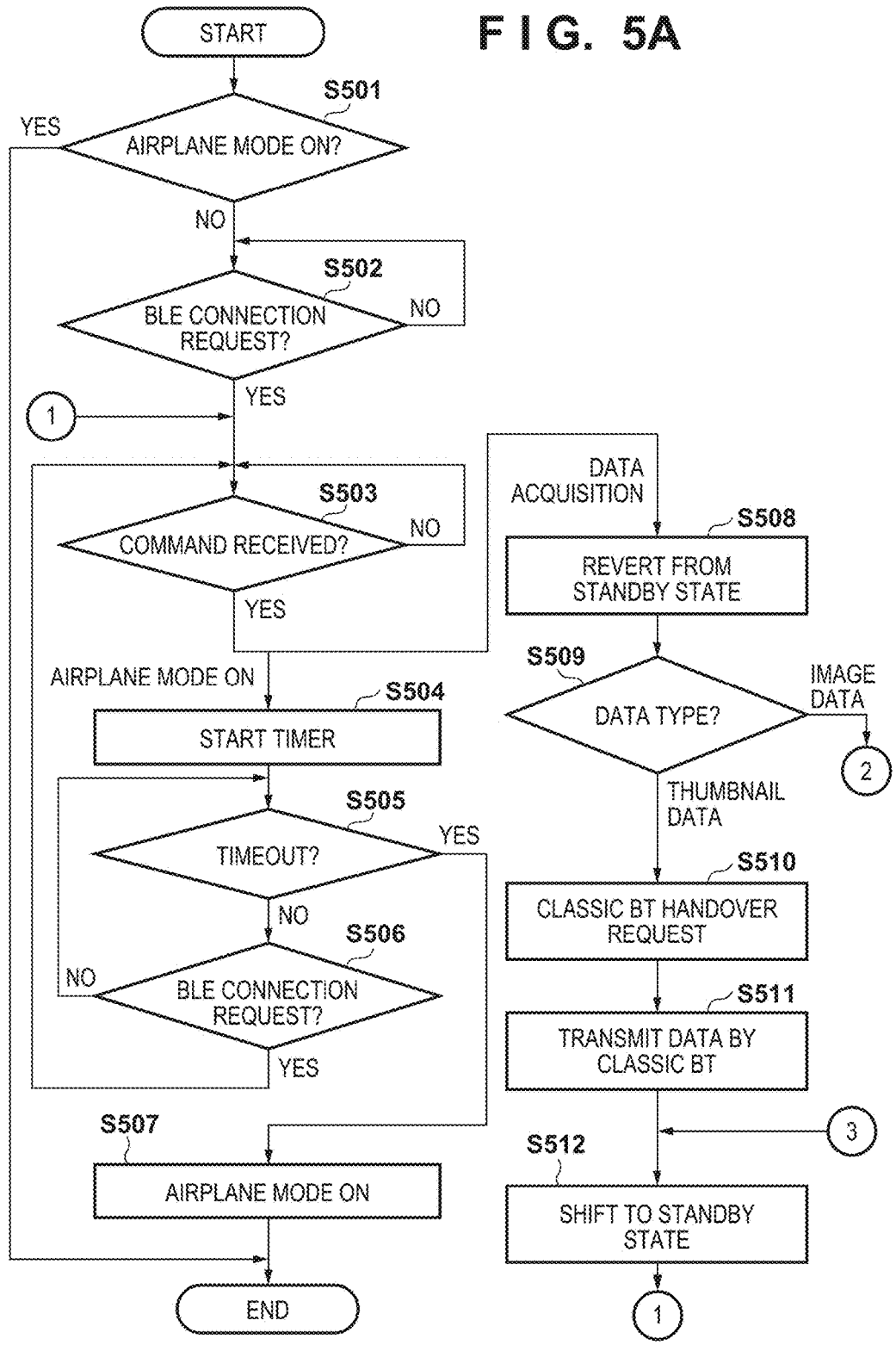
FIGS. 5A and 5B are flowcharts of operations of the digital camera according to the embodiment.
Figure 5B:
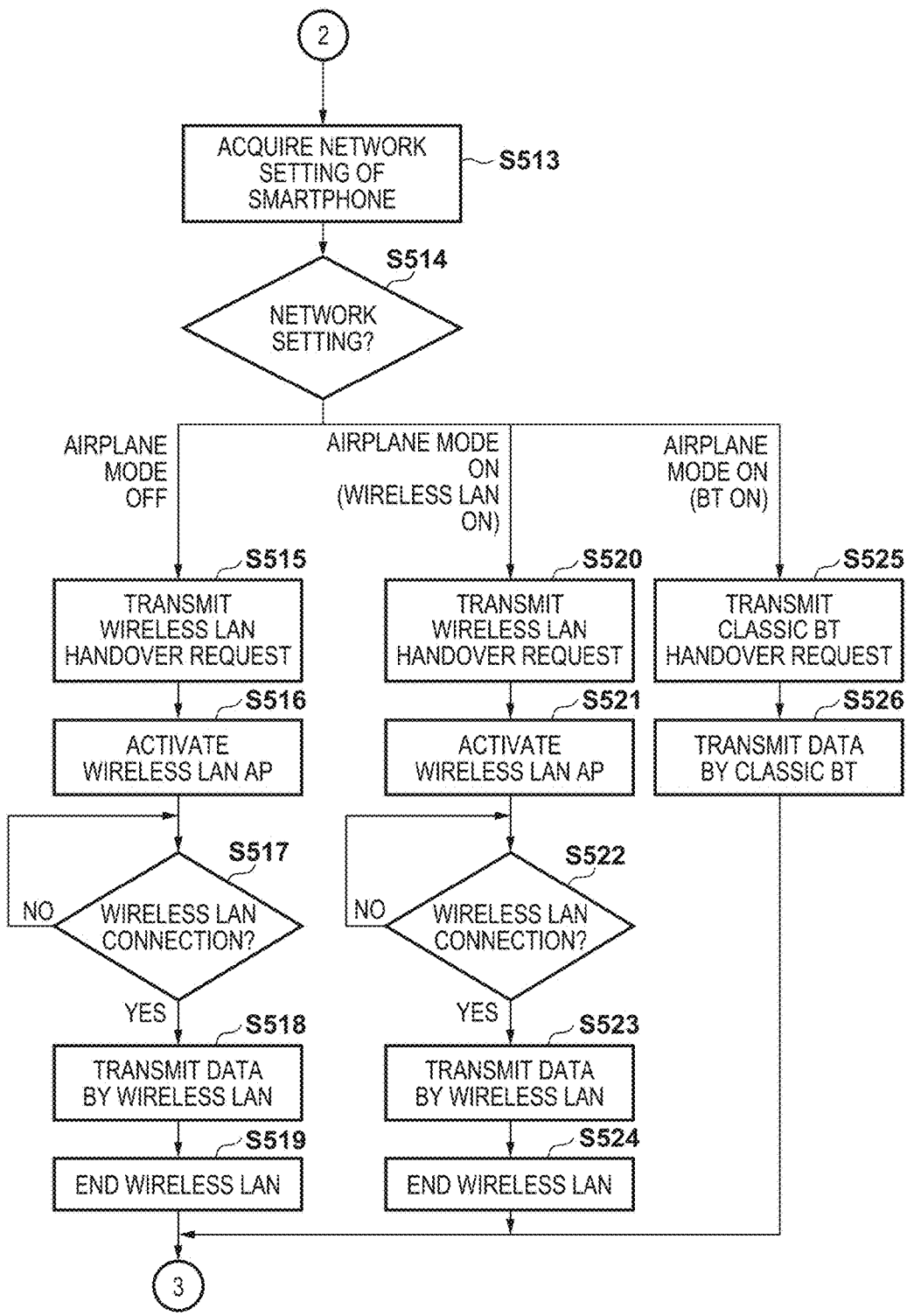

Note that the processing in FIGS. 5A and 5B is started when the digital camera A100 has shifted to the standby state. The standby state of the present embodiment is a state in which power is supplied to the sub controller A120 and the power-saving wireless communication unit A112. In the standby state, BLE communication can be performed, but other communication functions cannot be used without reversion from the standby state. Also, the following processing is realized by the controller A101 or the sub controller A120 of the digital camera A100 reading out a control program from the non-volatile memory A103, deploying the control program to the work memory A104, and executing the control program.

In step S501, the sub controller A120 determines whether or not the setting of the airplane mode of the digital camera A100 is on, proceeds to step S502 if the setting of the airplane mode is off, and ends the processing of this flowchart if the setting of the airplane mode is on. If the on/off setting of the airplane mode has been set in advance by the user through the GUI of FIGS. 2D and 2E, there are cases where the setting is changed in later-described step S507.

In step S502, the sub controller A120 monitors the state of the power-saving wireless communication unit A112, and waits until a BLE connection is made with the power-saving wireless communication unit A112. When a BLE connection is made with the power-saving wireless communication unit A112, the procedure proceeds to step S503. Here, it is assumed that the power-saving wireless communication unit B112 of the smartphone B100 becomes connected to the power-saving wireless communication unit A112. The processing of this step corresponds to later-described step S602 in FIG. 6.

In step S503, the sub controller A120 monitors the state of the power-saving wireless communication unit A112, and waits until a command (processing request) is received by BLE from the connection partner (smartphone B100). If an "airplane mode on request command" is received from the smartphone B100, the procedure proceeds to step S504, and if a "data acquisition request command" is received, the procedure proceeds to step S508. Although described later, the "airplane mode on request" of the present embodiment is a command that is transmitted from the smartphone B100 in accordance with the execution of an operation for switching on the airplane mode in the smartphone B100. The processing of this step corresponds to later-described steps S605 and S609 in FIG. 6.

In step S504, the sub controller A120 starts a timer for measuring the amount of time that has elapsed since reception of the "airplane mode on request command". In other words, even if the "airplane mode on request command" is received, the airplane mode is not switched on immediately.

In step S505, the sub controller A120 determines whether or not the time measured in step S504 has reached a predetermined time. The predetermined time may be a fixed value that is determined in advance, such as one minute, or may be set as desired by the user with use of a menu in a separate GUI for example. It is desirable that the predetermined time is a time that is sufficient for allowing the user to individually switch on the BT function after the airplane mode has been switched on. Accordingly, a duration such as 30 seconds to 60 seconds, or 60 seconds to 120 seconds is desirable. The procedure proceeds to step S506 if the predetermined time has not elapsed, and proceeds to step S507 if the predetermined time has elapsed.

In step S506, the sub controller A120 monitors the state of the power-saving wireless communication unit A112 and waits until a BLE connection is made with the power-saving wireless communication unit A112, similarly to step S502. The processing of this step corresponds to later-described steps S607 and S608 in FIG. 6. Here, if a BLE connection request is detected (i.e., if a BLE re-connect request is made within a predetermined time after reception of the "airplane mode on request command"), the procedure proceeds to step S503, and control can continue to be performed by BLE from the smartphone A100.

On the other hand, in step S507, the sub controller A120 ends communication performed by the power-saving wireless communication unit A112, and switches on the airplane mode. In other words, if a BLE re-connection request is not made within the predetermined time after reception of the "airplane mode on request command", the digital camera A100 switches off BLE, and shifts to an operation state in which radio waves are not emitted (airplane mode).

In step S508, the sub controller A120 switches on the supply of power to the digital camera A100, and operates such that subsequent control is performed by the controller A101.

In step S509, the controller A101 determines the type of data that is requested in the "data acquisition request command" that was received in step S503. If thumbnail data has been requested, the procedure proceeds to step S510, and if image data has been requested, the procedure proceeds to step S511.

In step S510, the controller A101 controls the power-saving wireless communication unit A112 to notify the smartphone B100 that subsequent communication is to be performed by classic BT (classic BT handover).

In step S511, the controller A101 changes the operating mode of the power-saving wireless communication unit A112 from BLE to classic BT. If thumbnail data is requested from the smartphone A100, the controller A101 reads out the requested thumbnail data from the recording medium A110, and transmits it to the smartphone B100 using the power-saving wireless communication unit A112. Note that steps S510 and S511 correspond to later-described steps S610 and S612 in FIG. 6.

In step S512, after the transmission of all of the requested data is complete, the controller A101 changes the communication mode of the power-saving wireless communication unit A112 to BLE, and operates such that control of the digital camera A100 is performed by the sub controller A120, thus shifting to the standby state.

On the other hand, if the result of the determination in step S509 is that the requested data is image data, in step S513, the controller A101 acquires the network setting state of the smartphone B100 using the power-saving wireless communication unit A112. The network setting is the state set with the GUI in the smartphone B100 that was described with reference to FIGS. 4A to 4D. Note that step S513 corresponds to later-described steps S610 and S611 in FIG. 6.

In step S514, the controller A101 proceeds to step S515, S520, or S525 in accordance with the network setting state of the smartphone B100 that was acquired in step S513.

Steps S515 to S519 are processing in the case where the network setting of the smartphone B100 that was acquired in step S513 is "airplane mode off" (FIG. 4A).

In step S515, the controller A101 uses the power-saving wireless communication unit A112 to notify the smartphone B100 that subsequent communication is to be performed by wireless LAN communication (wireless LAN handover). In this case, an SSID and a password for connecting to a software AP function that is activated in later-described step S516 are also transmitted at the same time.

In step S516, the controller A101 activates the software AP function of the wireless communication unit A111, and enters a state in which the wireless communication unit B111 of the smartphone B100 can directly connect to the wireless communication unit A111.

In step S517, the controller A101 monitors the state of the wireless communication unit A111, and waits until the wireless communication unit B111 of the smartphone B100 connects with the wireless communication unit A111.

In step S518, the controller A101 reads out the requested image data from the recording medium A110, and uses the wireless communication unit A111 to transmits the image data to the smartphone B100.

In step S519, when transmission of the requested image data is complete, the controller A101 deactivates the software AP mode of the wireless communication unit A111, and deactivates the functions of the wireless communication unit A111. Thereafter, the digital camera A100 shifts to the standby state in step S512, and then moves to a state of waiting for the next command in step S503. Note that steps S515 to S519 correspond to later-described steps S610 and S613 to S615 in FIG. 6.

The processing from steps S520 to S524 is processing in the case where the network setting of the smartphone that was acquired in step S513 is "airplane mode on", but "wireless LAN" and "BT" are available (FIG. 4D).

The processing of steps S520 to S524 is the same as the processing of steps S515 to S519. In other words, the software AP mode of the wireless communication unit A111 is activated, and the requested image data is transmitted from the wireless communication unit A111 to the smartphone B100.

The processing of steps S525 and S526 is processing in the case where the network setting of the smartphone that was acquired in step S514 is "airplane mode on", but only "BT" is available (FIG. 4C).

In step S525, the controller A101 uses the power-saving wireless communication unit A112 to notify the smartphone B100 that subsequent communication is to be performed by classic BT (classic BT handover).

In step S526, the controller A101 changes the operating mode of the power-saving wireless communication unit A112 from BLE to classic BT. If image data is requested from the smartphone A100, the controller A101 reads out the requested image data from the recording medium A110, and transmits it to the smartphone B100 using the power-saving wireless communication unit A112. Thereafter, the digital camera A100 shifts to the standby state in step S512, and then moves to a state of waiting for the next command in step S503. Note that steps S525 and S526 correspond to later-described steps S610 and S612 in FIG. 6.

It should also be noted that after the timer is started in step S504, if it is determined that the airplane mode has been switched on by an operation performed on the digital camera A100, the airplane mode is immediately switched on regardless of a timeout.

The digital camera A100 of the present embodiment controls communication with the smartphone B100 as described above.

Operations of Smartphone B100

Next, operations of the smartphone B100 that can communicate with the digital camera A100 of the present embodiment will be described with reference to FIG. 6.

Figure 6:
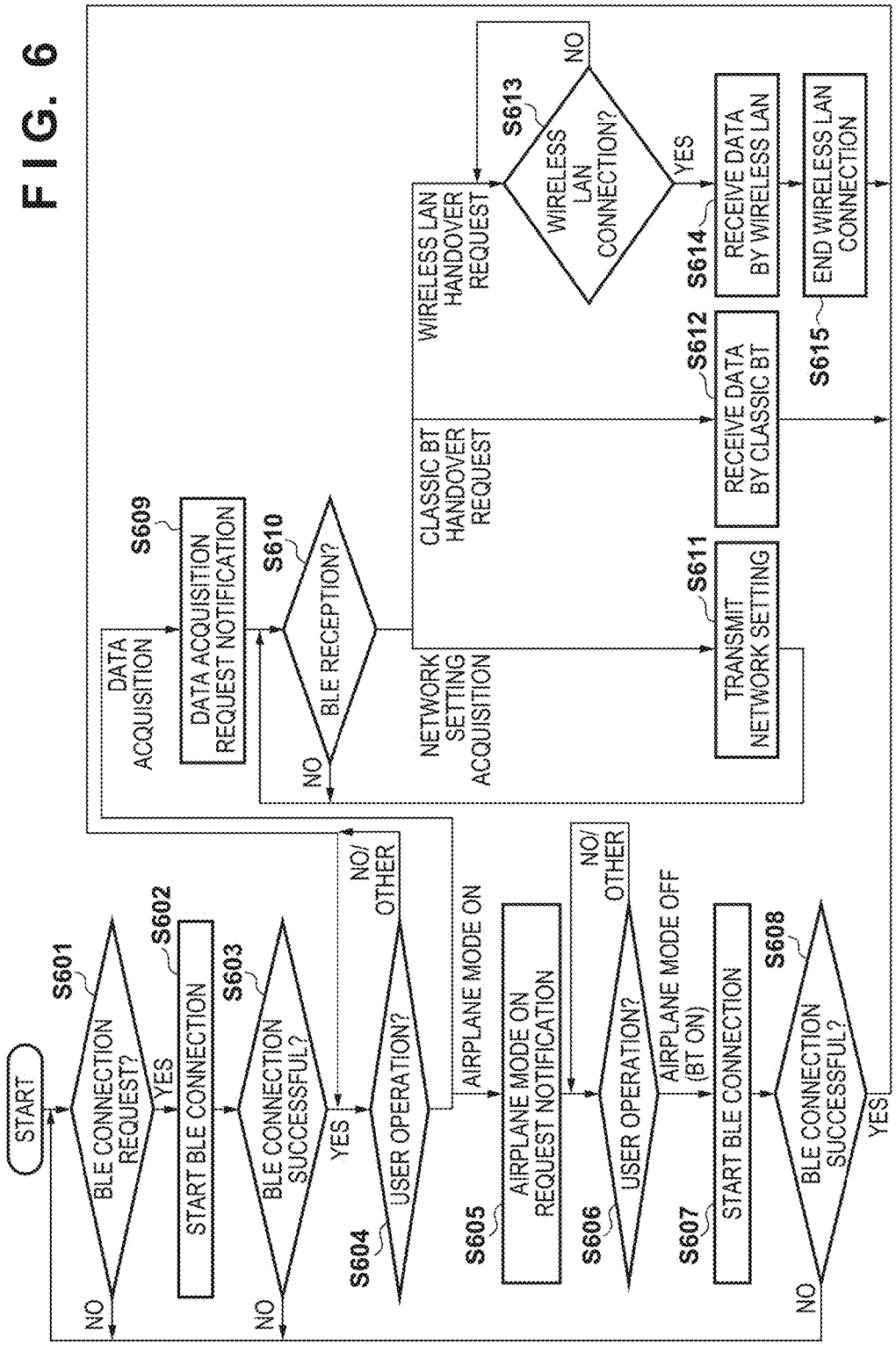
FIG. 6 is a flowchart of operations of the smartphone according to the embodiment.

Note that the processing in FIG. 6 is started when a request for BLE connection with the digital camera A100 is received through a user operation. Also, the following processing is realized by the controller B101 of the smartphone B100 reading out a control program from the non-volatile memory B103, deploying the control program to the work memory B104, and executing the control program.

Figure 7A:
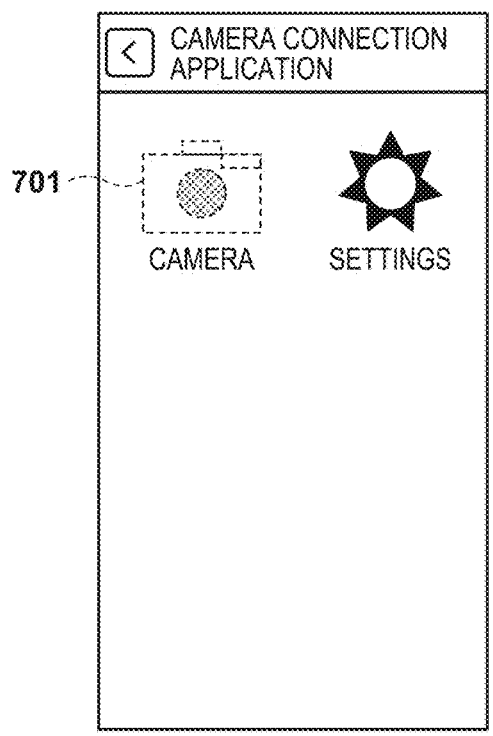
FIGS. 7A to 7D are diagrams illustrating a GUI of the smartphone according to the embodiment.

In step S601, the controller B101 waits until a BLE connection request is received from the digital camera A100. Specifically, the controller B101 displays the GUI shown in FIG. 7A on the display unit B106, and when a camera icon 701 is tapped using the operation unit B105, it is determined that a request for BLE connection with the digital camera A100 has been received.

In step S602, the controller B101 transmits a BLE connection request to the digital camera A100 using the power-saving wireless communication unit B112. The processing of this step corresponds to step S502 in FIG. 5A.

Figure 7B:
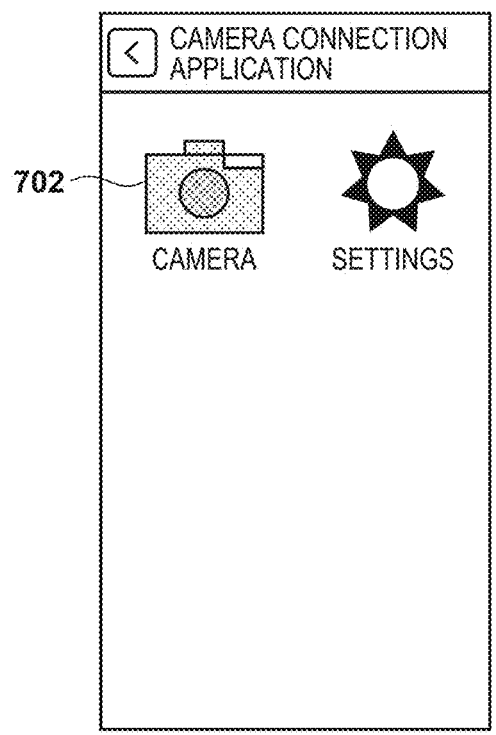

In step S603, in accordance with the BLE connection request that was started in step S602, the controller B101 waits for a BLE connection to be established between the power-saving wireless communication unit B112 and the power-saving wireless communication unit A112 of the digital camera A100. When a BLE connection is established, the controller B101 updates a camera icon 702 on the display unit B106 to the state in the GUI shown in FIG. 7B so as to notify the user that a connection has been established with the digital camera A100.

Figure 7C:
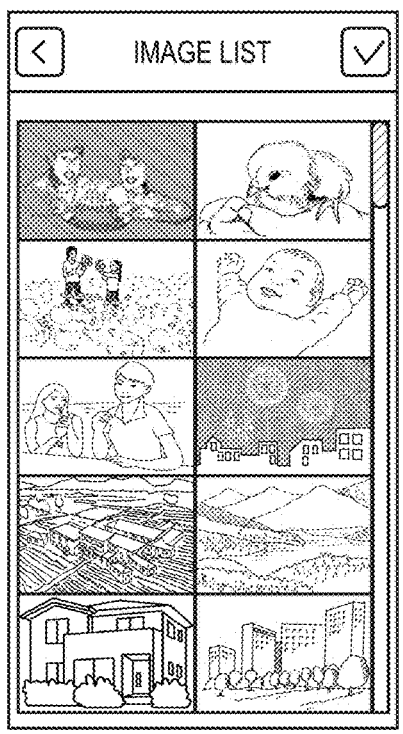
Figure 7D:
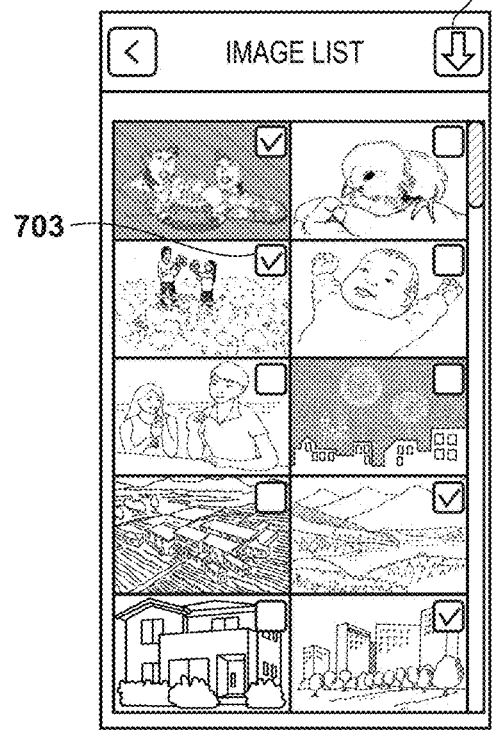

In step S604, the controller B101 monitors the operation state of the operation unit B105, and waits for a user operation. In step S604, if an operation for switching on the airplane mode is detected (if the airplane mode is changed to the on state in the GUI in FIG. 4A), the procedure proceeds to step S605, and if an operation for requesting the acquisition of data from the digital camera A100 is detected, the procedure proceeds to step S609. Here, an operation for requesting the acquisition of data from the digital camera A100 includes the case where the camera icon 702 is selected in the GUI in FIG. 7B, and the screen shifts to the thumbnail list screen shown in FIG. 7C, and the case where one or more thumbnails in the thumbnail list screen are selected (703 in FIG. 7D), and a download icon 704 is selected.

The processing of steps S605 to S609 is processing in the case where an operation for switching on the airplane mode is detected in step S604.

In step S605, the controller B101 uses the power-saving wireless communication unit B112 to transmit the "airplane mode on request command" to the digital camera A100 in order for the airplane mode to be switched on in the digital camera A100 in conjunction with the smartphone B100. The processing of this step corresponds to the case where the "airplane mode on request command" is received in step S503 in FIG. 5A.

In step S606, the controller B101 monitors the operation state of the operation unit B105, and again waits for a user operation. In step S606, if an operation for switching off the airplane mode is detected (if the airplane mode is changed to the off state in the GUI in FIG. 4B), or an operation for switching on the BT function in the airplane mode on state is detected (if the BT function is switched on in the GUI in FIGS. 4B and 4C), the procedure proceeds to step S607.

In step S607, the controller B101 transmits a BLE reconnect request to the digital camera A100 using the power-saving wireless communication unit B112.

In step S608, in accordance with the BLE connection request that was given in step S607, the controller B101 waits for a BLE connection to be established between the power-saving wireless communication unit B112 and the power-saving wireless communication unit A112 of the digital camera A100. If a connection is established within a predetermined time, the procedure returns to step S604, and the controller B101 waits for a user operation, whereas if a connection is not established, the procedure returns to step S601, and the controller B101 waits for the user to explicitly give a request for connection with the digital camera A100. Steps S607 and S608 correspond to step S506 in FIG. 5A. If an "airplane mode off" or "BT ON" operation is performed by a user operation before timeout is determined in step S505 in FIG. 5A, the BLE connection with the digital camera A100 is recovered without waiting for an explicit connection request from the user.

The processing of steps S609 to S615 is processing in the case where an operation for requesting data from the digital camera A100 is detected in step S604.

In step S609, the controller B101 transmits a "data acquisition request command" to the digital camera A100 using the power-saving wireless communication unit B112. Here, the controller B101 also transmits a notification of the type of data that is requested ("thumbnail data" or "image data"). The processing of this step corresponds to the case where the "data acquisition request command" is received in step S503 in FIG. 5A.

In step S610, the controller B101 monitors the power-saving wireless communication unit B112 and waits for a request from the digital camera A100. The request received in step S610 is any of the requests that are transmitted in steps S510, S513, S515, S520, and S525 in FIGS. 5A and 5B. In step S610, if a network setting acquisition request is received, the procedure proceeds to step S611, if a classic BT handover request is received, the procedure proceeds to step S612, and if a wireless LAN handover request is received, the procedure proceeds to step S613.

The processing of step S611 is processing in the case where a network setting acquisition request is received in step S610.

In step S611, the controller B101 transmits the network setting state of the smartphone B100, which was described with reference to FIGS. 4A to 4D, to the digital camera A100 using the power-saving wireless communication unit B112, and then the procedure returns to step S610.

The processing of step S612 is processing in the case where a classic BT handover request is received in step S610.

In step S612, the controller B101 changes the operating mode of the power-saving wireless communication unit B112 from BLE to classic BT. Then, in accordance with the GUI display on the display unit B106 and the operation content from the operation unit B105, thumbnail data or image data is requested from the digital camera A100. Data received by the power-saving wireless communication unit B112 is stored in the work memory B104 (in the case where thumbnail data was received) or in the recording medium B110 (in the case where image data was received). The processing of this step corresponds to steps S511 and S526 in FIGS. 5A and 5B.

When the reception of data by classic BT in step S612 ends, the procedure returns to step S604, and the controller B101 enters a state of waiting for the next user operation.

The processing of steps S613 to S615 is processing in the case where a wireless LAN handover request is received in step S610.

In step S613, the controller B101 changes a setting such that the wireless communication unit B111 connects with the wireless communication unit A111 of the digital camera A100 with use of the SSID and the password that were received along with the wireless LAN handover request. When a wireless LAN connection is established in step S613, the procedure proceeds to step S614.

In step S614, in accordance with the GUI display on the display unit B106 and the operation content from the operation unit B105, the controller B101 requests image data from the digital camera A100. Image data that is received by the wireless communication unit B111 is stored in the recording medium B110. The processing of this step corresponds to steps S518 and S523 in FIG. 5B.

In step S615, the controller B101 deactivates the wireless communication unit B111 and ends the wireless LAN connection.

When the reception of data by wireless LAN communication in steps S613 to S615 ends, the controller B101 returns to step S604 and waits for the next user operation.

As described above, according to the present embodiment, in the state where a BLE connection is established between the digital camera A100 and the smartphone B100, after the airplane mode of the smartphone B100 is set to the ON state, if a re-connect request is received from the smartphone B100 within a predetermined time, the BLE connection between the digital camera A100 and the smartphone B100 is maintained.

Accordingly, even in the case where the smartphone B100 and the digital camera A100 are brought inside an airplane in a BLE connected state, and then the airplane mode of the smartphone B100 is set to the on state, if the user operates the smartphone B100 and switches on a communication function that is permitted inside the airplane, wireless communication between the smartphone B100 and the digital camera A100 can continue to be usable without requiring the user to perform another setting operation on the digital camera A100.

Note that in the present embodiment, operations have been described in the case where the airplane mode is set to the on state while a BLE connection is established, but the configuration of the present embodiment is similarly applicable even in the case where the airplane mode has been switched on while a wireless LAN connection is established.

Also, in the present embodiment, the digital camera A100 does not have a function similar to that of a smartphone for connecting to a public line, but a case is also conceivable in which instead of the digital camera A100, the communication partner has a function for connecting to a public line, as with a second smartphone or a tablet device for example. In this case, it is sufficient that in the case where the "airplane mode on request command" is received in step S503 in FIG. 5A, processing for switching off communication functions other than BT is executed.

Also, the digital camera A100 of the present embodiment waits for a BLE connection request to be received within a predetermined time in the state where BLE has been activated (step S506 in FIG. 5A), but the digital camera A100 may wait for a wireless LAN connection request in the state where wireless LAN has been activated. Also, the digital camera A100 may wait for a connection request in the state where both BLE and wireless LAN have been activated.

Moreover, although the digital camera A100 of the present embodiment waits for a connection request to be received within a predetermined time, it is not necessarily required that reception of a connection request is a condition. For example, a configuration is possible in which in the case where an operation is performed for switching on wireless LAN or BT in step S606 in FIG. 6, the smartphone B100 transmits a notification to that effect to the digital camera A100. If this notification is transmitted, the digital camera A100 receives the notification in step S506, and can perform control such that the communication function that was switched on in the smartphone B100 is prevented from being switched off.

The present invention is not limited to the variations described above, and various modifications can be applied. For example, the present invention is applicable to an aspect in which even in the case where the airplane mode has been switched on in the smartphone B100, a predetermined time is provided for allowing the reception of a setting change in the smartphone B100 instead of immediately following the change in the digital camera A100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-242709, filed Dec. 14, 2016 which is hereby incorporated by reference herein in its entirety.

What is claimed is:

1. A communication apparatus comprising:
a processor; and
a plurality of communication interfaces configured to be capable of wireless communication with an external apparatus,
wherein in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, the processor does not deactivate a communication function of the predetermined communication interface for a predetermined time,
in a case where a second notification is received via the predetermined communication interface within the predetermined time, the second notification being transmitted in accordance with execution of an operation for individually activating at least one communication function out of the communication functions of the plurality of communication interfaces of the external apparatus, the processor determines to maintain the communication function of the communication interface corresponding to the second notification in an activate state even after the predetermined period elapses, and
after the predetermined time elapses, the processor maintains the communication function of the communication interface corresponding to the second notification in the activate state, and deactivates a communication function of a communication interface that does not correspond to the second notification.

2. The apparatus according to claim 1, further comprising: an operation unit configured to accept an operation for deactivating all communication functions of the plurality of communication interfaces, wherein in a case where the operation is accepted via the operation unit in the predetermined time, the processor deactivates all communication functions of the plurality of communication interfaces.

3. The apparatus according to claim 1, wherein the processor does not deactivate a communication function of two or more communication interfaces out of the plurality of communication interfaces.

4. The apparatus according to claim 1, wherein the predetermined time is a time for waiting for an operation for individually activating at least one communication function out of communication functions of the plurality of communication interfaces of the external apparatus.

5. The apparatus according to claim 1, wherein the predetermined time is a time longer than 30 seconds.

6. The apparatus according to claim 1, wherein the predetermined time is a time longer than one minute.

7. The apparatus according to claim 1, wherein the predetermined communication interface includes a low-speed communication mode and a high-speed communication mode, and the processor performs control of communication functions when a connection is established with the external apparatus in the low-speed communication mode.

8. The apparatus according to claim 7, wherein the predetermined communication interface is a Bluetooth interface, the low-speed communication mode is a mode of communication that is based on Bluetooth Low Energy, and the high-speed communication mode is a mode of communication that is based on Classic Bluetooth.

9. The apparatus according to claim 1, wherein a short-range wireless communication and a wireless LAN interface are included out of the plurality of communication interfaces.

10. The apparatus according to claim 1, wherein the operation for deactivating all communication functions of the plurality of communication interfaces of the external apparatus is an operation of switching on an airplane mode.

11. The apparatus according to claim 1, wherein the plurality of communication interfaces include a public network interface for connection with a public network, and in a case where the first notification is received via the predetermined communication interface, the processor deactivates the public network interface before elapse of the predetermined time.

12. A control method of a communication apparatus having a processor and a plurality of communication interfaces that are capable of communication with an external apparatus, the method comprising:

in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, not deactivating a communication function of the predetermined communication interface for a predetermined time, in a case where a second notification is received via the predetermined communication interface within the predetermined time, the second notification being transmitted in accordance with execution of an operation for individually activating at least one communication function out of the communication functions of the plurality of communication interfaces of the external apparatus, maintaining the communication function of the communication interface corresponding to the second notification in an activate state even after the predetermined period elapses, and after the predetermined time elapses, maintaining the communication function of the communication interface corresponding to the second notification in the activate state and deactivating a communication function of a communication interface that does not correspond to the second notification.

13. A non-transitory computer-readable storage medium storing a program for causing a computer to function as a communication apparatus comprising:

a processor; and a plurality of communication interfaces configured to be capable of wireless communication with an external apparatus, wherein in a case where a first notification is received from the external apparatus via a predetermined communication interface out of the plurality of communication interfaces, the first notification being transmitted in accordance with execution of an operation for deactivating all communication functions of a plurality of communication interfaces of the external apparatus, the processor does not deactivate a communication function of the predetermined communication interface for a predetermined time, in a case where a second notification is received via the predetermined communication interface within the predetermined time, the second notification being transmitted in accordance with execution of an operation for individually activating at least one communication function out of the communication functions of the plurality of communication interfaces of the external apparatus, the processor determines to maintain the communication function of the communication interface corresponding to the second notification in an activate state even after the predetermined period elapses, and after the predetermined time elapses, the processor maintains the communication function of the communication interface corresponding to the second notification in the activate state and deactivates a communication function of a communication interface that does not correspond to the second notification.

* * * * *